United States Patent [19]
Brown

[11] Patent Number: 5,160,614
[45] Date of Patent: Nov. 3, 1992

[54] AIR DUCT BLOCK FOR AIR/WATER UNDERDRAIN SYSTEMS IN GRAVITY FILTERS

[75] Inventor: Marvin A. Brown, Sewickley, Pa.

[73] Assignee: The F.B. Leopold Company, Inc., Zelienople, Pa.

[21] Appl. No.: 841,046

[22] Filed: Feb. 25, 1992

[51] Int. Cl.⁵ .................. B01D 24/24; B01D 24/46
[52] U.S. Cl. .................. 210/275; 210/293; 210/793
[58] Field of Search ............... 210/292, 293, 793, 275

[56] References Cited

U.S. PATENT DOCUMENTS

| | | | |
|---|---|---|---|
| 2,378,239 | 6/1945 | Myron | 210/148 |
| 2,559,936 | 7/1951 | Buffle | 210/130 |
| 2,710,692 | 6/1955 | Kegel et al. | 210/130 |
| 3,110,667 | 11/1963 | Stuppy | 210/293 |
| 3,468,422 | 9/1969 | Camp | 210/274 |
| 3,512,649 | 5/1970 | Nebolsine et al. | 210/274 |
| 3,831,761 | 8/1974 | Chantereau | 210/274 |
| 3,954,620 | 5/1976 | Nebolsine | 210/275 |
| 4,064,050 | 12/1977 | Heaney et al. | 210/293 |
| 4,065,391 | 12/1977 | Farabaugh | 210/293 |
| 4,118,322 | 10/1978 | San Roman | 210/136 |
| 4,214,992 | 7/1980 | Sasano et al. | 210/274 |
| 4,331,542 | 5/1982 | Emrie | 210/794 |
| 4,619,765 | 10/1986 | Roberts | 210/293 |
| 4,707,257 | 11/1987 | Davis et al. | 210/274 |
| 4,795,555 | 1/1989 | Wurster | 210/293 |
| 4,923,606 | 5/1990 | Gresh et al. | 210/275 |
| 5,087,362 | 2/1992 | Brown | 210/293 |
| 5,108,627 | 4/1992 | Berkebile et al. | 210/793 |

Primary Examiner—Stanley S. Silverman
Assistant Examiner—Cynthia L. Nessler
Attorney, Agent, or Firm—Webb, Burden, Ziesenheim & Webb

[57] ABSTRACT

An air duct block for air/water underdrain systems in gravity filters comprising a row of interconnected air duct blocks positioned below the filtering media and extending transversely to the underdrain laterals. Each air duct block is in communication with at least one adjacent individual underdrain filter block to supply backwash gas thereto during backwashing operations, thereby supplying backwash gas to its associated lateral. Each air duct block is in further communication with at least one adjacent air duct block such that backwash gas flows between the interconnected air duct blocks and along the row of air duct blocks. This system supplies backwash gas to the entire underdrain system through a single pipe from a source of supply.

15 Claims, 10 Drawing Sheets

AIR DUCT BLOCK FOR AIR/WATER UNDERDRAIN SYSTEMS IN GRAVITY FILTERS

This application is commonly assigned with co-pending U.S. application No. 07/649,448 filed Feb. 1, 1991 now U.S. Pat. No. 5,108,627, entitled "Filter Underdrain Block"; and co-pending U.S. application No. 07/736,521 filed Jul. 26, 1991, now U.S. Pat. No. 5,087,362, entitled "Flume Distribution Systems with Removable Block".

BACKGROUND OF THE INVENTION

1. Field of the Invention

The present invention is directed to a distribution system for supplying backwash gas and liquid to a gravity filter of the type having a granular filter bed through which a liquid to be treated may flow downwardly.

2. Description of the Prior Art

Granular media filters, which are commonly used for the purification of water, typically comprise a carefully graded filter bed of particulate media such as sand, anthracite, or other known materials. The filter bed is supported above a floor by an underdrain which serves as an outlet for filtered effluent exiting the bed and an inlet for backwash fluids. In use, as the water to be treated is passed downwardly through the filter bed, the suspended solids are removed from the liquid and retained within the granular media. Periodically, it is necessary to remove the suspended solids collected in the filter bed by backwashing the filter bed. Backwashing is conventionally achieved by passing backwash fluids upwardly through the filter media, loosening and removing the suspended solids to carry them to the top of the filter bed. It is desirable that the backwash fluids, water and optionally air, be distributed evenly throughout the filter bed. Uneven distribution of the backwash fluids may cause shifting in the graded filter bed media, thereby decreasing the effectiveness of the filter bed and possibly leaving portions of the filter bed uncleaned.

Various cleaning systems for gravity filters have been devised in the prior art. For example, U.S. Pat. No. 2,710,692 discloses a filter cleaning system including a gas supply pipe 5 extending the length of the flume. Distribution holes in the gas distribution pipe 5 distribute backwash gas from the pipe into the filter bed. The difficulty with this apparatus is that the distribution pipe takes up water flow area in the flume, thereby limiting the operational rate of the filter during normal filtering operations.

U.S. Pat. No. 3,512,649 discloses another system for supplying backwash gas and liquid to a gravity filter bed. The backwash gas is delivered through a series of independent pipes running throughout the filter media support. The difficulties with this system include the extensive labor required in installing such a system, the added cost of materials for such a system, and the increased likelihood of corrosion or fouling due to the multiplicity of pipes.

Another system for cleaning gravity filters is disclosed in U.S. Pat. No. 3,831,761. This system supplies backwash gas through a central distributor pipe in which each conduit 10 has an associated dip tube, or downpipe, providing communication between the conduit and the backwash gas distributor pipe 15. The gas distributor pipe in this system is also located in the flume or exhaust chamber which, as discussed above, may place operational limitations on the filter. Furthermore, the individual downpipes are expensive as well as difficult to install. A similar system is disclosed in U.S. Pat. No. 3,468,422, wherein backwash gas is supplied to each individual lateral from a main air header pipe 56 through a series of J-shaped piping branches, at least one of which extends to each individual lateral. Here again, the air header piping takes up needed water flow area in the flume, the air header piping may be expensive, and such piping and multiple individual branches are difficult to install.

Finally, the air/water underdrain backwash system disclosed in U.S. Pat. No. 4,331,542 provides separate liquid and gas systems for backwashing. The duplication of a second system to supply backwash gas can be expensive, and since the gas and the liquid do not mix until they are both in the filter bed itself, a thorough, even cleaning is not possible.

It is therefore an object of this invention to maximize water flow area in the flume by the elimination of the air header pipe previously positioned in the flume. It is a further object of this invention to minimize the cost of the underdrain system by minimizing the amount of piping needed and simplifying the installation of the underdrain. It is a still further object of this invention to minimize or eliminate filter dead spaces where no backwash air/water flows.

SUMMARY OF THE INVENTION

In accordance with the objects of this invention, an improved underdrain for air/water backwash in a gravity filter system has been designed comprising a series of modular, interconnected air duct blocks. The air duct blocks are arranged in a single row positioned below the filtering media. The row of air duct blocks extends substantially transversely to a plurality of laterals defined by parallel adjacent rows of connected individual underdrain filter blocks. Each of the air duct blocks is in communication with at least one adjacent underdrain filter block, whereby the air duct block is adapted to supply backwash gas during backwash operations to the adjacent underdrain filter block and its associated row of filter blocks. Each air duct block is also in communication with at least one adjacent air duct block to allow backwash gas to flow between the connected air duct blocks. The interconnection of the air duct blocks may be through an integral tube or through connectors which place the interiors of separate air duct blocks in fluid communication with one another. The air duct block system can supply all of the filter blocks of the underdrain with backwash gas through a single downpipe extending from the source of gas supply.

A first embodiment utilizes separate couplings to connect adjacent air duct blocks and provides a front facade to match the configuration of the adjacent underdrain block. The air duct blocks of this embodiment are designed as modular units, thereby making them easily adaptable to a variety of filter systems.

A second embodiment provides for communication of the backwash gas between adjacent air duct blocks through a continuous pipe extending across the air duct blocks. The pipe is received in a saddle formed in the air duct block with apertures in the tube to feed the adjacent underdrain lateral blocks with backwash gas.

A third embodiment includes a rectangular pipe to feed backwash gas to adjacent air duct blocks. The pipe is received in a space formed in an air duct block with apertures formed in the pipe. An aperture connection formed in the air duct block feeds backwash gas to the adjacent underdrain block. This connection includes a removable orifice for varying the flow rate of gas into each lateral.

The use of an integral pipe to supply the backwash gas to adjacent air duct blocks as in the second and third embodiments guarantees the unimpeded flow of backwash gas along the row of air duct blocks. The integral pipe also eliminates the connection time of attaching individual adjacent air duct blocks.

A fourth embodiment is a retrofitted underdrain block which has a rectangular cutout which receives a backwash gas source pipe to supply backwash gas to the underdrain. Filler material is positioned in the remaining portions of the cutout, with a top surface of the filler material slanted toward the adjacent underdrain blocks so that filtered effluent may flow down to the appropriate distribution hole and backwash gas may be guided to the filter media above the filler. This embodiment also has the advantage of an integral pipe communicating between adjacent underdrain blocks, while providing for quick, easy retrofitting of existing underdrain systems.

Further details and advantages of this invention will become apparent from the following description in conjunction with the accompanying drawings.

DETAILED DESCRIPTION OF THE PREFERRED EMBODIMENTS

Figure 1:
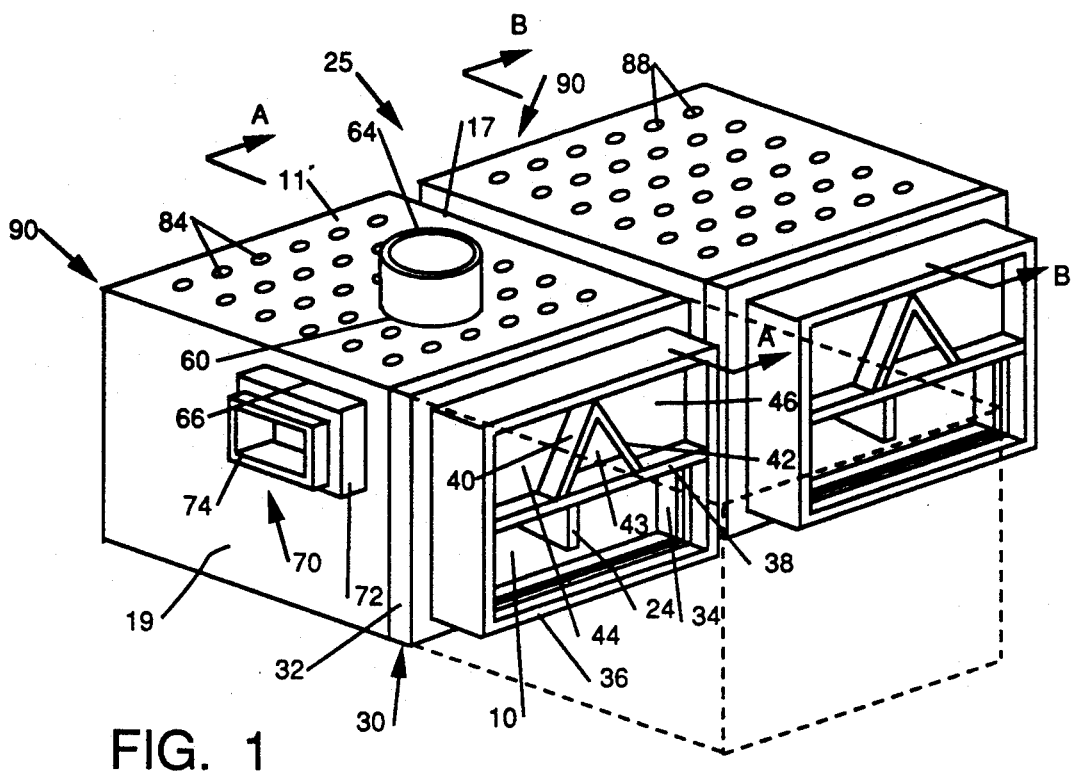
FIG. 1 is a perspective view of a first embodiment of the air duct block system of this invention.

A typical gravity filter in accordance with the present invention includes an underdrain having a plurality of filter blocks arranged end-to-end in parallel, adjacent rows or "laterals". FIG. 1 shows a first embodiment of the invention wherein a plurality of air duct blocks 25 are arranged in an interconnected series or row across a filter bottom (not shown), transversely to the laterals. Each row of air duct blocks 25 includes a master air duct block 90 which receives gas during backwashing from a downpipe connected to a gas supply. The master air duct block 90 distributes gas to each of the other air duct blocks 25 through their intercommunication. Each of the air duct blocks is in fluid communication with at least one adjacent underdrain lateral and feeds backwash gas to each individual lateral, as described in further detail below.

Figure 3:
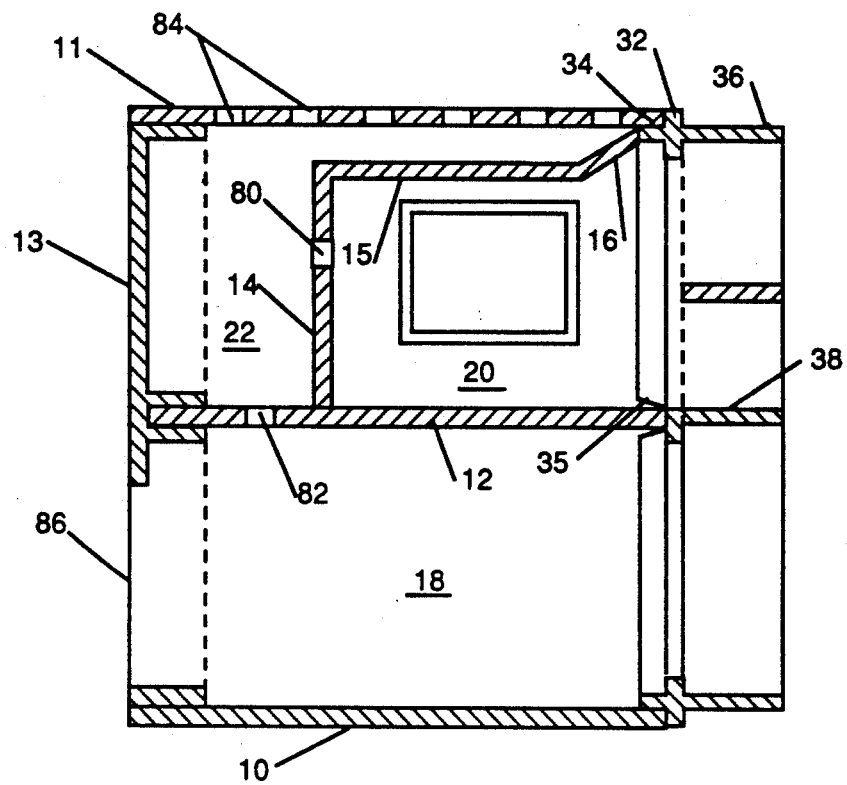
FIG. 3 is a sectional view taken along line BB of the air duct block illustrated in FIG. 1.
Figure 4:
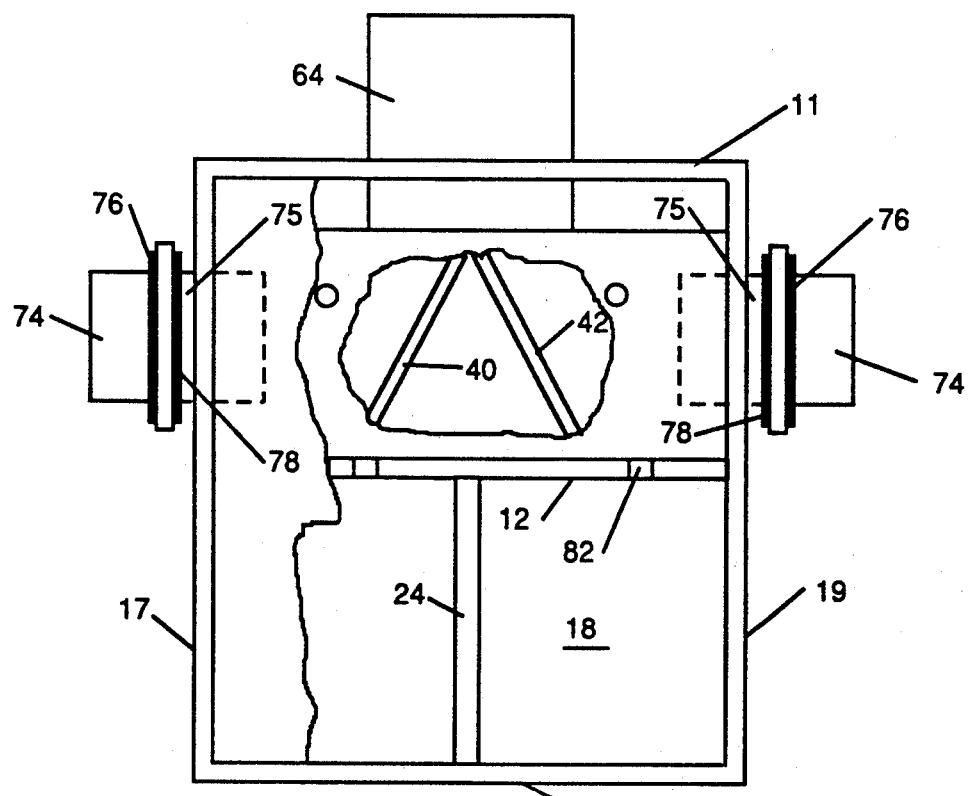
FIG. 4 is a rear view, partially broken away, of the master air duct block illustrated in FIG. 1.

Each air duct block comprises sidewalls 17 and 19, a top surface 11, a bottom surface 10, and a rear wall 13. Shown in FIGS. 2 and 3, a plurality of interior walls including a middle partition 12 and dividing wall sections 14, 15 and 16 are provided in each block to divide the block into a water chamber 18, a primary gas chamber 20 and a mixing chamber 22. Referring to FIG. 4, a support wall 24 is positioned in water chamber 18, spanning between the bottom surface 10 and the middle partition 12. The support wall 24 divides the water chamber 18 into two portions and also provides support for middle partition 12.

Figure 2:
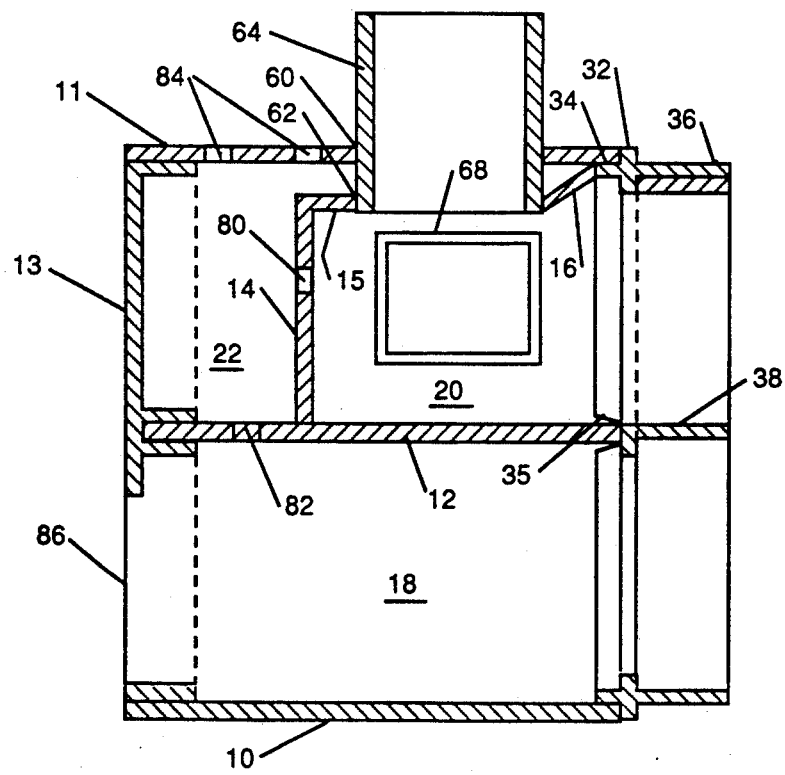
FIG. 2 is a sectional view taken along line AA of a master air duct block illustrated in FIG. 1.

A front facade 30, positioned between the front portion of the air duct blocks and the adjacent filter underdrain block, is designed to have a configuration matching an interior wall configuration of the adjacent filter block. The front facade 30 is provided with an internal flange 34 and a mounting flange 32 extending around the perimeter of the front facade 30. The mounting flange 32 and the internal flange 34 cooperate with and abut the sidewalls 17 and 19, the top surface 11 and the bottom surface 10 of the air duct block, as shown in FIGS. 2 and 3. A gap 35 in the internal flange 34 provides clearance for the middle partition 23 when the front facade 30 is mounted on the air duct block. An external flange 36 engages with and provides for mounting between the air duct block and the adjacent underdrain filter block, as shown in phantom in FIG. 1.

Figure 5:
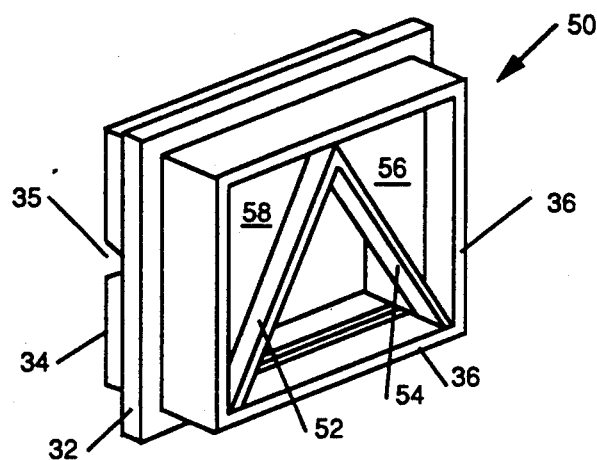
FIG. 5 illustrates a front facade.
Figure 6:
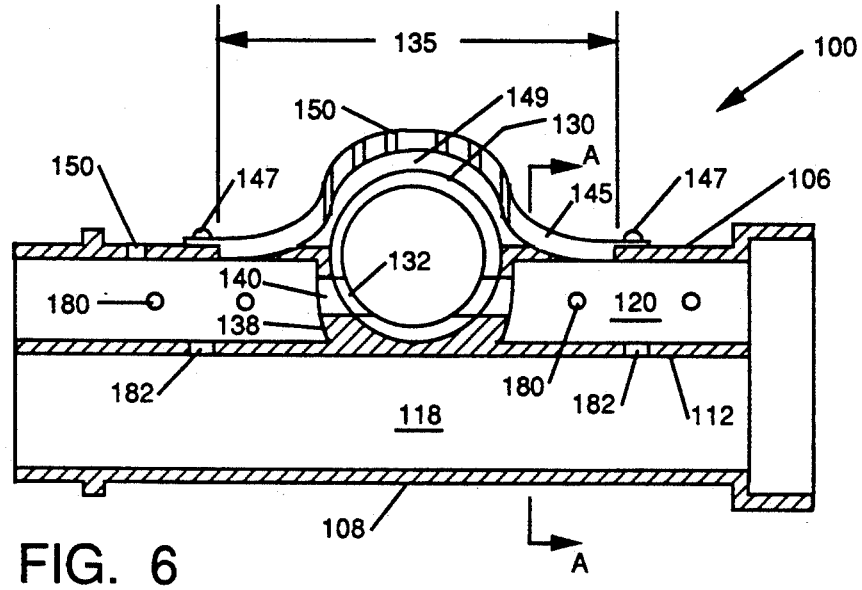
FIG. 6 is a sectional view of a second embodiment of the air duct block system of this invention.

As noted above, the front facade is designed to cooperate with, and correspond with, the specific design of the filter blocks being used in the gravity filter. Front facade 30 includes a middle plate 38, which is located at a height corresponding to the height of middle partition 12, two side planes 40 and 42 defining a primary gas conduit 43, and two end cap walls 44 and 46. This specific facade is designed to match the configuration of the filter underdrain block disclosed in Applicant's copending U.S. application No. 07/649,448, filed Feb. 1, 1991, now U.S. Pat. No. 5,108,627, entitled "Filter Underdrain Block" FIG. 5 illustrates a second type of front facade 50, which has an identical mounting flange 32, internal flange 34 with associated gap 35, and external flange 36. Side plates 52 and 54 define primary conduit 53, flanked by end cap walls 56 and 58. The configuration of the interior portion of front facade 50 differs in that it is designed to correspond to the type of filter block configuration disclosed in U.S. Pat. No. 4,065,391.

In both facades, 30, 50, the triangular portion (43, 53) defined between the side plates communicates with primary gas chamber 20 in the air duct block 10. In front facade 30, the area below the middle plate 38 communicates with water chamber 18, while in front facade 50, the same triangular space 53 which communicates with the primary gas chamber 20 also serves to communicate with the water chamber 18. In both embodiments, the end cap walls isolate the primary gas chamber 20 and cap off the mixing chambers which extend through each adjacent filter underdrain block so that primary gas chamber 20 is in sealed communication with the primary gas conduit 43. It should be understood that various front facades corresponding to different filter block configurations may easily be designed, and are within the scope of the present invention.

The sidewalls 17 and 19 in air duct blocks 25 are additionally provided with openings 66 and 68, respectively. These openings are in communication with the primary gas chamber 20 and receive a block coupler 70 to couple adjacent air duct blocks. The block coupler 70 includes a mounting lip 72 and two engaging projections 74 and 75 mounted on opposite sides of the mounting lip 72. One of these engaging projections is adapted to be received in the sidewall opening of a first air duct block while the other engaging projection is adapted to be received in the adjacent sidewall opening of a second air duct block. Resilient grommets 76 and 78 are provided to assure a tight seal between the block coupler 70 and the air duct blocks.

The primary gas chamber 20 is provided with metering holes 80 to allow for communication between the primary gas chamber and the mixing chamber 22. Water chamber 18 is additionally provided with metering holes 82 for communication between the water chamber 18 and the mixing chamber 22, and distribution orifices 84 in top surface 11 are also in communication with mixing chamber 22. As shown in FIGS. 2 and 3, mixing chamber 22 extends across the top of the primary gas chamber 20 and directly below top surface 11. A flume opening 86 in rear wall 13 provides communication between the water chamber 18 and a flume, as known in the art.

The master air duct block 90, illustrated most clearly in FIG. 2, differs from blocks 25 in that it includes an opening 60 in the top surface 11 and an opening 62 in the dividing wall 15. A source connection pipe 64 extends through these two openings and is in communication with primary gas chamber 20. A downpipe may be connected to source connection pipe 64 to provide backwash gas to the primary gas chamber 20, which is in fluid communication with all gas chambers 20 in the remaining blocks 25.

In normal filtering operations, wastewater to be cleansed seeps through the filter media (not shown) and the effluent proceeds into the air duct block through distribution orifices 84. The effluent then enters mixing chamber 22, passes through metering hole 82 into water chamber 18 and proceeds to the flume.

In backwashing operations, backwash liquid is provided to each lateral via the flume. Backwash liquid flows through the flume opening 86 and into water chamber 18 then to the lateral through the matching opening in the front facade. Backwash gas, such as air, is provided to the air duct blocks by first being pumped into master air duct block 90 through the source connection pipe 64. The primary gas chamber 20 of one air duct block supplies gas to an adjacent air duct block through block coupler 70. The air duct blocks provide gas to the primary gas conduit of each individual underdrain lateral through the corresponding opening 43, 53 in the front facade.

Metering holes 82 admit backwash liquid into mixing chamber 22, which mixes with backwash gas from the primary gas chamber fed through metering holes 80. The liquid/gas mixture is distributed to, and will clean, the filter media directly above the air duct blocks when forced out of distribution orifices 84 through the portion of the mixing chamber 22 which overlies primary gas chamber 20. This construction eliminates the need for individual downpipes for each underdrain lateral, thereby saving significant space in the filter media and reducing labor required for installation.

FIGS. 6–10 illustrate a second embodiment of the invention comprising air duct blocks of a slightly different configuration which are also in communication with each other. The air duct block 100 includes sidewalls 102 and 104, a top surface 106, and a bottom surface 108. Support wall 124, middle partition 112 and side partitions 114 and 116 serve to divide the air duct block into water chambers 118, a primary gas conduit 120, and mixing chambers 122 and 123.

Figure 7:
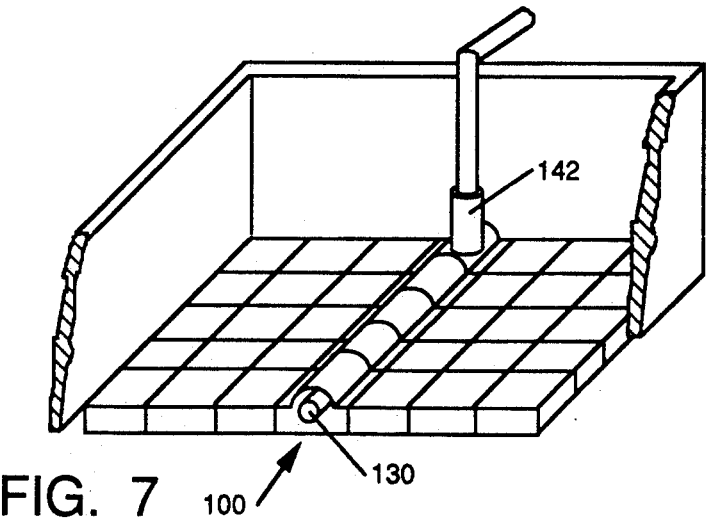
FIG. 7 is a perspective view of the air duct block system of the second embodiment shown in a filter cell.
Figure 8:
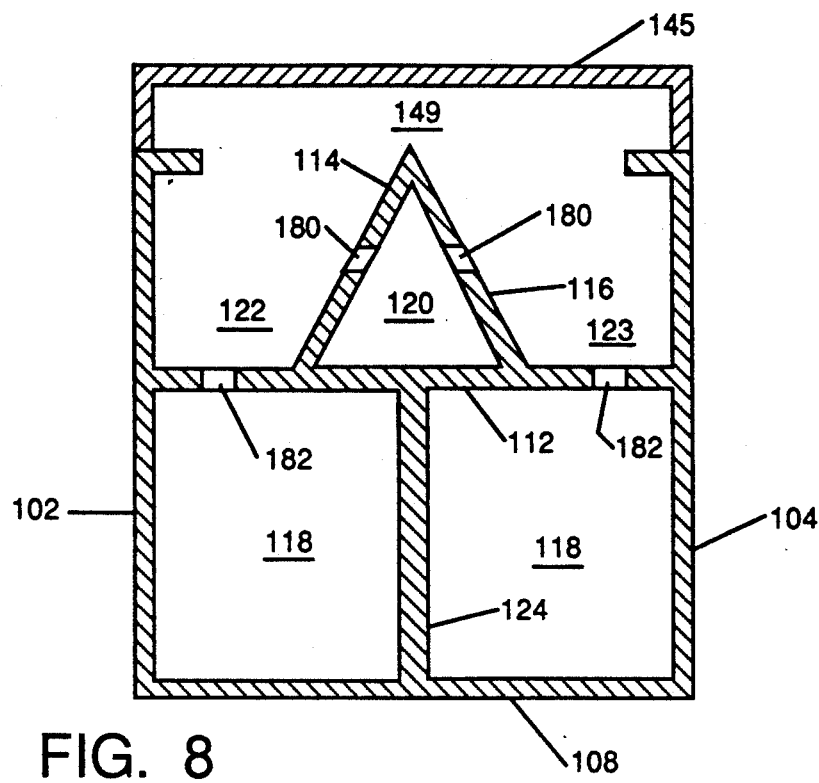
FIG. 8 is a sectional view taken along line AA of the air duct block illustrated in FIG. 6.
Figure 9:
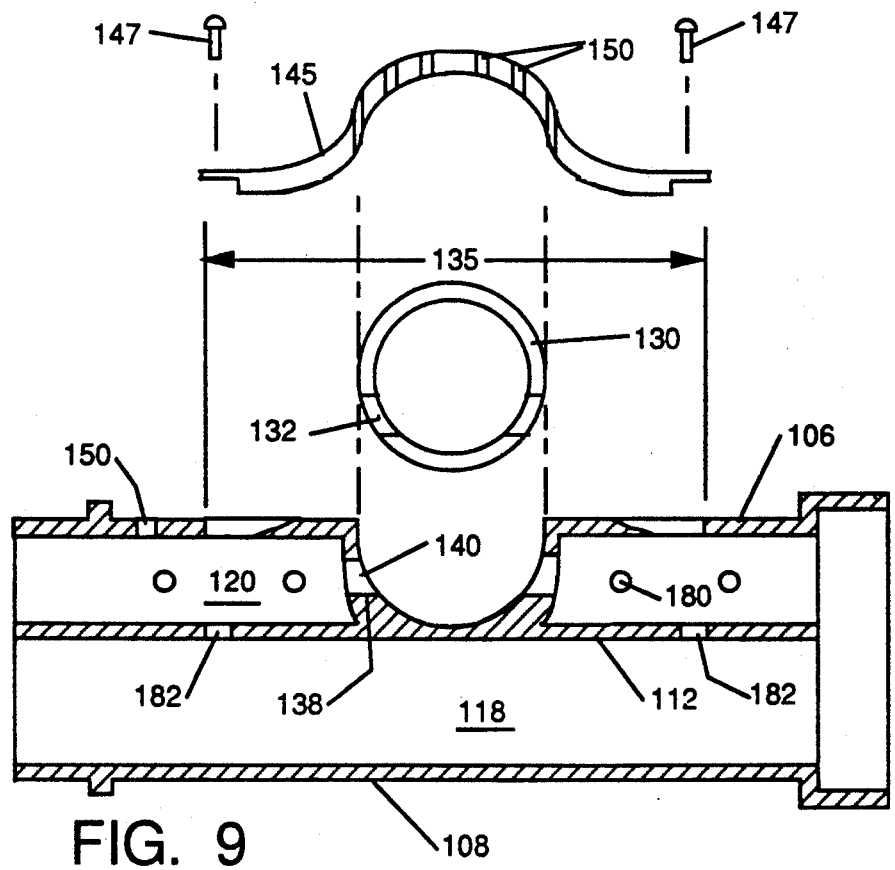
FIG. 9 is an exploded view of the air duct block illustrated in FIG. 6.
Figures 10, 11:
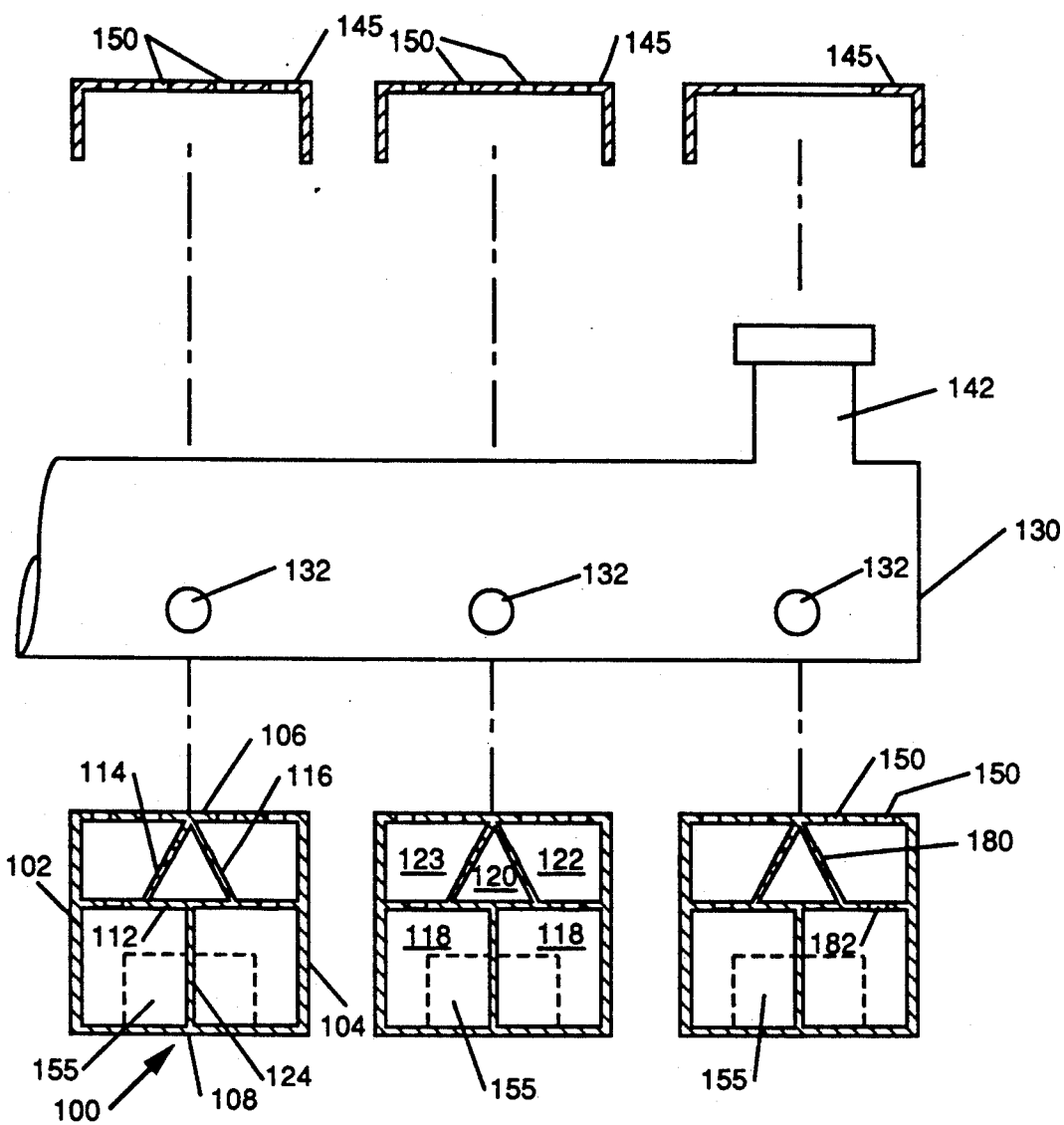
FIG. 10 is an exploded, front view of the air duct block illustrated in FIG. 6.
FIG. 11 is a further modification of the air duct block system of the second embodiment.

A gas source pipe 130 extends across the air duct blocks 100 and lies substantially orthogonal to the longitudinal axis of the individual laterals as shown in FIGS. 7 and 11. The gas source pipe 130 is adapted to be received in an opening 135 formed in the top surface 106. A saddle assembly 138 is integrally formed with middle partition 112 and partitions 114, 116. The saddle assembly 138 is shaped to roughly correspond to the configuration of gas source pipe 130, as most clearly seen in FIG. 9, thereby providing a means for positively locating and supporting the gas source pipe 130. The gas source pipe 130 is provided with gas pipe apertures 132 which will align with openings 140 located in saddle assembly 138. This alignment allows for communication between the gas source pipe and the primary gas conduit 120. The interior of the gas source pipe 130 and the primary gas conduit together form the gas chamber. The gas source pipe 130 includes a connector 142 to connect the gas source pipe to a supply for backwash gas through a single downpipe as shown in FIGS. 7 and 11.

A semicircular top cover 145 is connected to the top surface 106 adjacent opening 135 by attaching means 147 and forms another mixing chamber 149 located above the gas source pipe 130. Shown in FIG. 8, this mixing chamber 149 is in communication with mixing chamber 122 and mixing chamber 123 by virtue of opening 135 in the top surface 106. Distribution orifices 150 are located throughout top cover 145 and top surface 106, extending between the filter bed and the mixing chambers. Water chamber 118 is provided with metering holes 182 to allow for communication between the water chamber 118 and the mixing chambers 122 and 123. Metering holes 180 in primary gas conduit 120 allow for communication with mixing chambers 122 and 123.

In operation, this embodiment works analogously to the first embodiment. The effluent flows through distribution holes 150 and the water chamber metering holes 182 into the water chamber 118 and through the water chamber 118 down the lateral and into the flume. In backwashing operations, the backwash liquid flows from the flume into water chambers 118 and to mixing chambers 122 and 123 through metering holes 182. The backwash gas flows into the gas source pipe 130 through the source pipe connection 142 and into each individual primary gas conduit of every air duct block through gas pipe apertures 132. The air duct block will thus supply its associated lateral with backwash gas. The backwash gas flows into the mixing chambers 122 and 123 from the primary gas conduit 120 through primary gas conduit metering holes 180. The mixture of backwash liquid and gas is distributed to the filter bed through distribution orifices 150 located in the top surface 106 and top cover 145.

Figure 12:
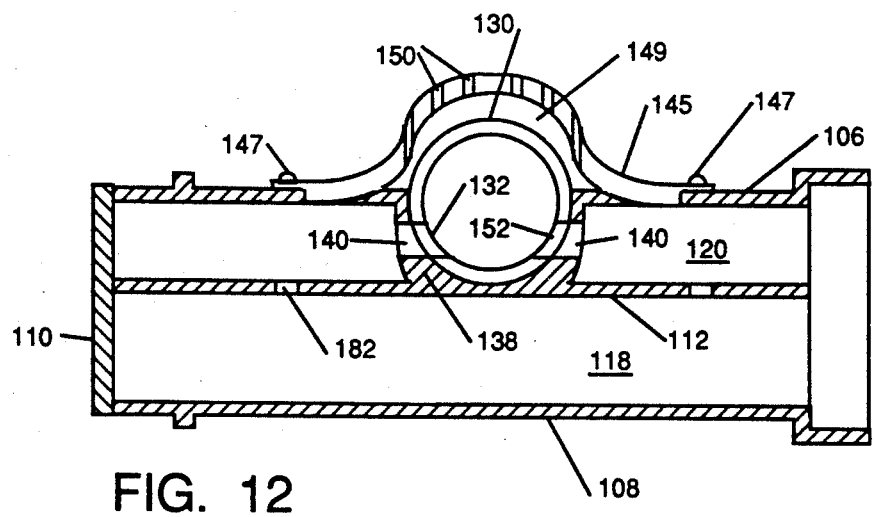
FIG. 12 is a sectional view of the air duct block illustrated in FIG. 11.

FIGS. 11 and 12 illustrate a further modification of this embodiment. In this modification, the row of air duct blocks 100 are placed at the end of the lateral adjacent a filter wall. As shown in FIG. 12, the air duct block 100 is provided with a rear wall 110. If the air duct blocks are placed adjacent the flume opening, a corresponding opening 155 (illustrated in phantom in FIG. 10) in rear wall 110 would be provided to allow for communication between the flume and the water chambers 118. This communication will allow for flow of effluent out of and backwash liquid into water chamber 118.

FIGS. 13-19 illustrate a third embodiment of this invention. The air duct blocks 200 of this embodiment comprise sidewalls 202 and 204, top surface 208, bottom surface 210, and rear wall 206. Middle partition 212 cooperates with sidewalls 202 and 204 and bottom surface 210 to define water chamber 218 Supporting wall 224 is additionally provided to support middle partition 212 and divide water chamber 218 into two halves. The top surface 208, the middle partition 212 and the bottom surface 210 abut against corresponding surfaces of an adjacent lateral underdrain block 225. Additionally, mounting flanges 220 and 221 are provided on the top surface 208 and the bottom surface 210, respectively, to provide for easier, more secure mounting onto the adjacent underdrain block.

A gas source pipe 230 extends across the row of air duct blocks, located in a cutout between the top surface 208 and the middle partition 212. The gas source pipe 230 is received by the cutout and is orthogonal to the longitudinal axis of the individual laterals. The gas source pipe 230 communicates with the primary gas conduits of the individual laterals through gas pipe aperture 232. An aperture connector 234 is integrally formed with the middle partition. This aperture connector 234, together with resilient seal 236, provides for a sealed communication between the gas source pipe and the primary gas conduits. A source pipe connector 242 is positioned along the gas source pipe 230 to allow for supply of gas through a single downpipe from a conventional source.

Figure 14:
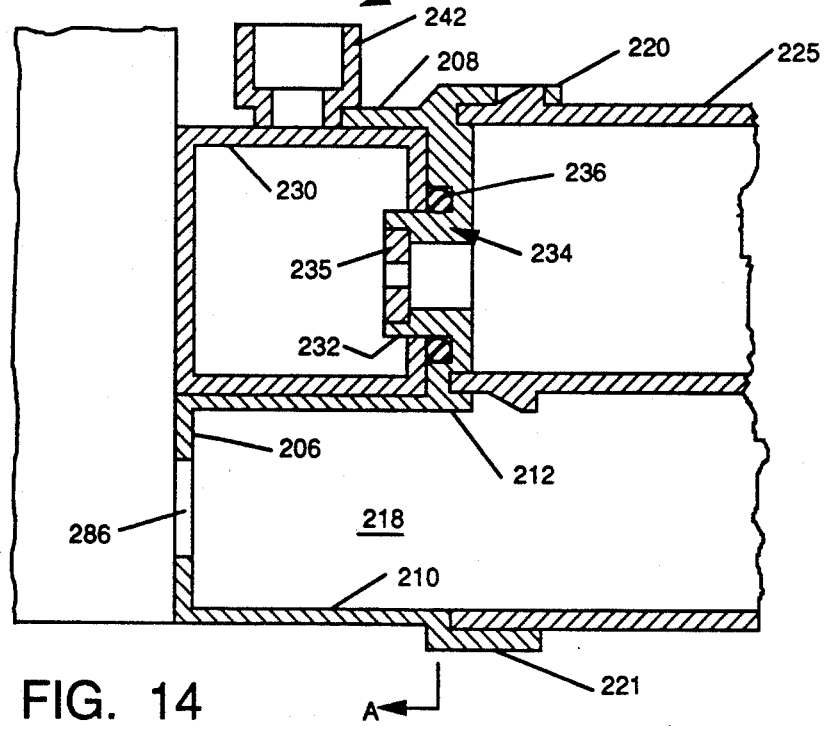
FIG. 14 is a sectional view of the master air duct block illustrated in FIG. 13.

The aperture connector may be provided with a removable orifice 235 as shown in FIG. 14. The orifice 235 permits trial and error determination of ideal flow rates for each individual underdrain lateral. The size of the orifice regulates the velocity of backwash gas therethrough. The orifice may be press-fitted into connector 234 during trial runs and subsequently heat welded when permanent installation is required.

Figure 13:
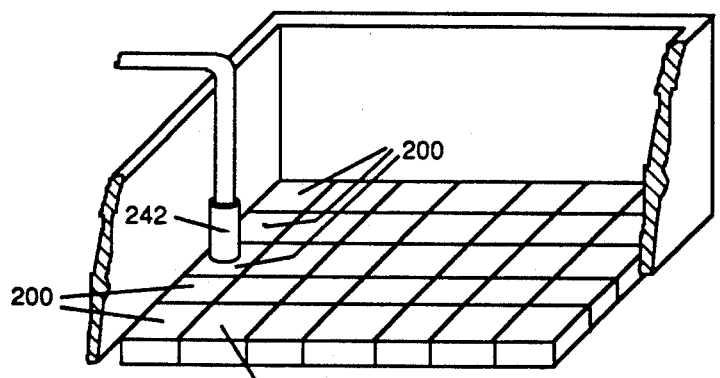
FIG. 13 illustrates a third embodiment of the air duct block system of this invention.
Figure 15:
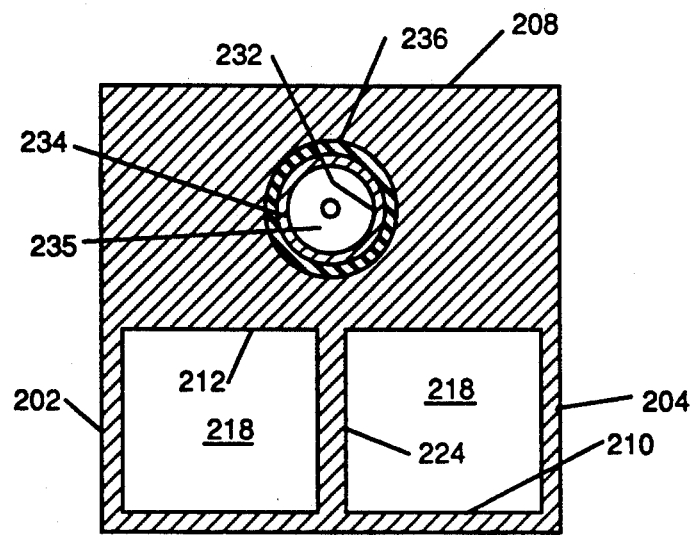
FIG. 15 is a front view of the air duct block illustrated in FIG. 13.

The air duct block illustrated in FIGS. 13-15 provides a flume opening 286 located in rear wall 206. This flume opening communicates with an adjacent flume to provide for flow of effluent out of the water chamber 218, and for flow of backwash fluid into water chamber 218. It is understood that this flume opening need not be provided and the rear wall may be formed continuously if the air duct block is not positioned adjacent the flume.

Figure 16:
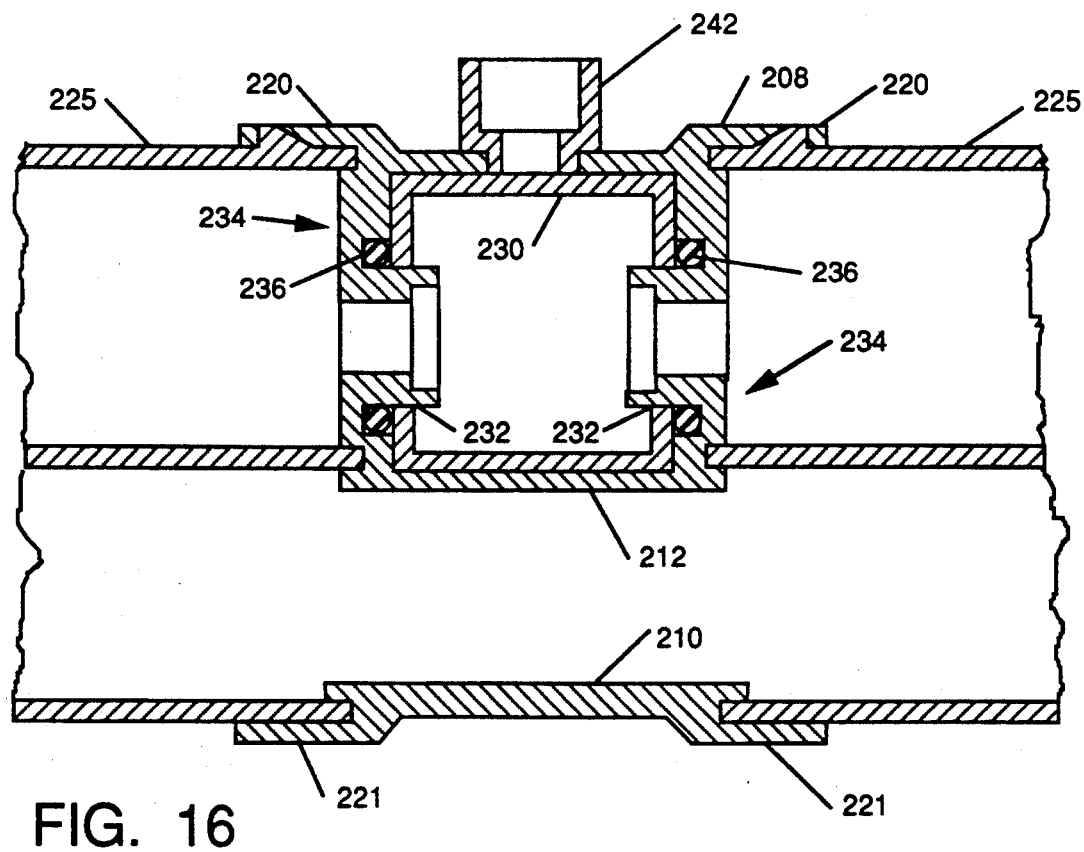
FIG. 16 is a sectional view of a first modification of the air duct block of the third embodiment.

FIG. 16 shows a modification of this embodiment, wherein the row of air duct blocks is provided in the middle of the filter cell, such that the laterals extend on either side of the air duct blocks. In this modification, additional aperture connectors 234 and mounting flanges 220 and 221, are provided on the opposite side of the air duct block to cooperate with a lateral which extends from that side of the air duct block. Additionally, the rear wall 206 and the corresponding flume opening 286 are not present in this embodiment so that water chamber 218 is in communication with the water chambers in each opposed lateral 225.

Figure 17:
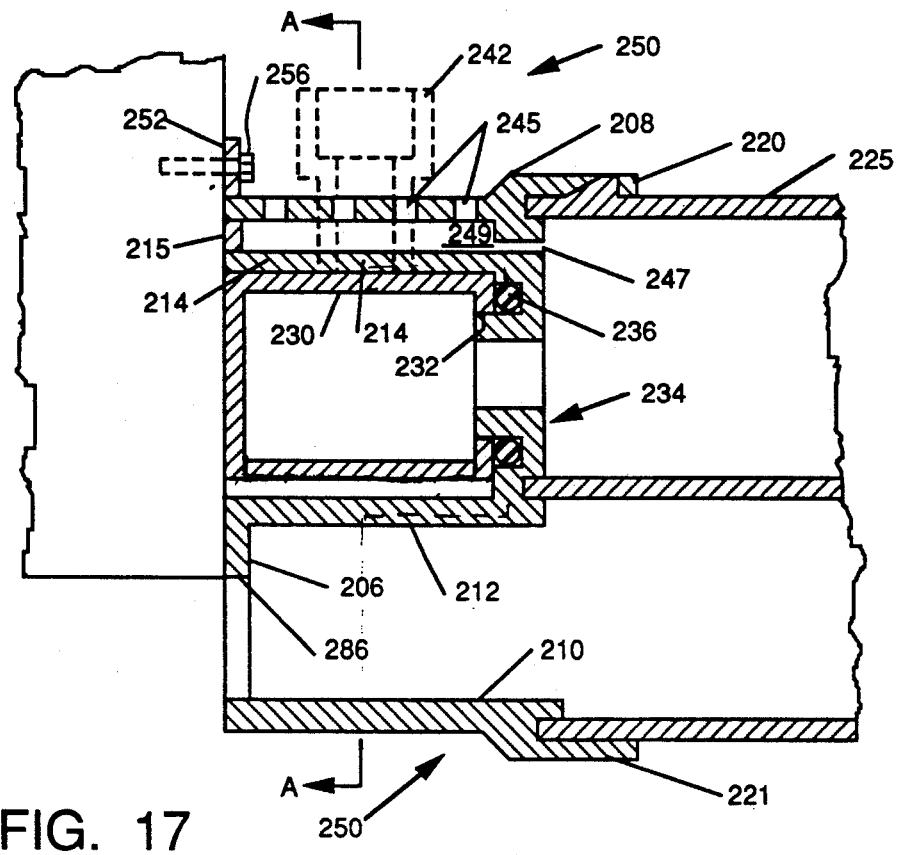
FIG. 17 is a sectional view of a second modification of the air duck block of the third embodiment.
Figure 18:
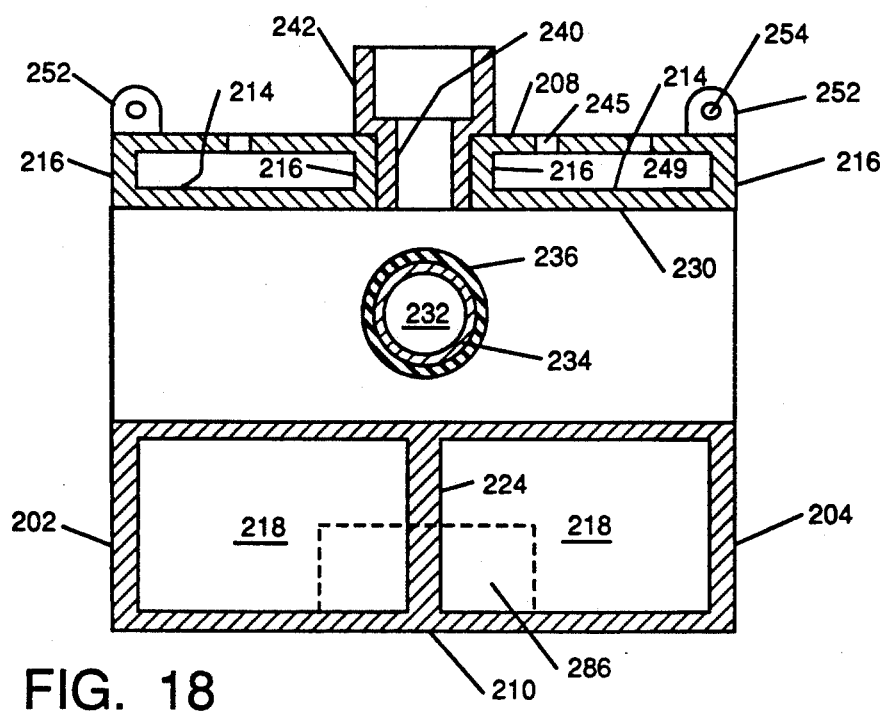
FIG. 18 is a sectional view along lines A—A of the air duct block illustrated in FIG. 17.

FIGS. 17 and 18 illustrate a further modification of this embodiment. The air duct block 250 of this embodiment includes elements previously discussed, such as: sidewalls 202 and 204, rear wall 206 together with an optional flume opening 286 if the air duct blocks are adjacent the flume, top surface 208, bottom surface 210, middle partition 212, water chamber 218, mounting flanges 220 and 221, support wall 224, gas source pipe 230, gas pipe aperture 232, aperture connector 234, resilient seal 236, and a source pipe connector 242. In this embodiment, the gas source pipe 230 is constructed to have slightly less height such that dividing wall sections 214, 215 and 216 may be provided to cooperate with top surface 208 to define a mixing chamber 249. Top surface 208 has distribution orifices 245 which communicate with mixing chamber 249. Mixing chamber 249 has a mixing chamber opening 247 which communicates with a secondary conduit in the adjacent underdrain lateral block 225, as described in application Ser. No. 07/649,448 and U.S. Pat. No. 4,065,391. Mounting brackets 252, which contain mounting bracket holes 254, through which bracket connectors 256 extend, are positioned to help support the modified top surface and associated structure. The mounting bracket 252 may be attached to the filter cell wall by bracket connectors 256 to provide support. This modified version allows effluent to flow down through and backwash liquid and gas to flow back out of the area immediately above the air duct block.

Figure 19:
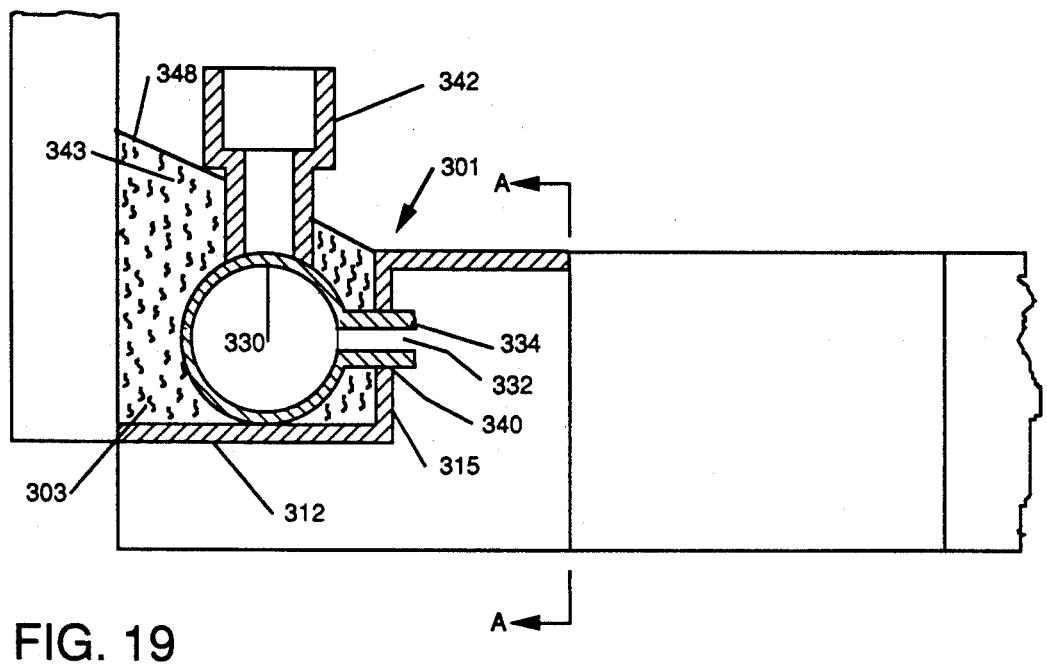
FIG. 19 is a sectional view illustrating a fourth embodiment of the invention.
Figure 20:
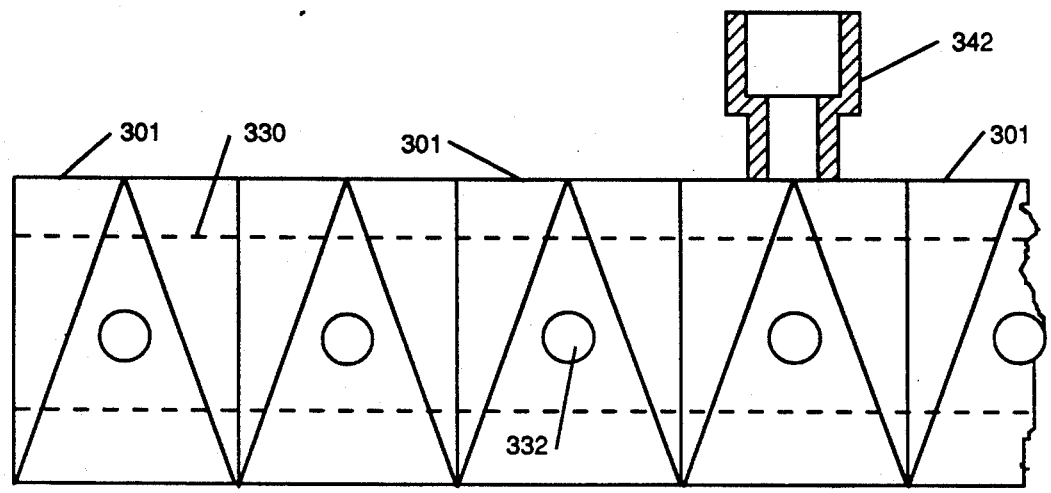
FIG. 20 is a front view of the air duct block illustrated in FIG. 19.
Figure 21:
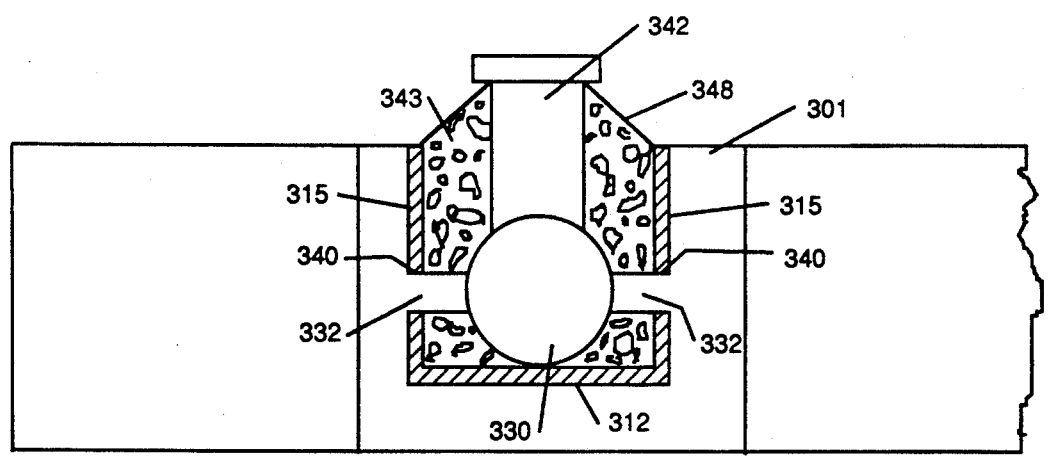
FIG. 21 is a sectional view of a further modified air duct block of the fourth embodiment.

FIGS. 19-21 illustrate a fourth embodiment in which the air duct block is constructed from a conventional underdrain lateral block, such as the type illustrated in U.S. Pat. No. 4,065,391. Portions of the top surface and sidewalls are cut in the underdrain lateral blocks which are to be formed into the air duct blocks 301. A cutout 303 is produced, and the cutouts are aligned such that they extend transversely across the rows of underdrain filter blocks. A middle partition 312 and a dividing wall section 315 are positioned in each of these underdrain blocks to seal the cutout 303 from the remaining portions of the block. A gas source pipe 330 is positioned in the cutout 303 such that it lies transversely across the longitudinal axis of the individual laterals. The gas source pipe 330 includes gas pipe apertures 332. Aperture connectors 334 extend through dividing wall opening 340 and cooperate with the gas pipe apertures 332 to provide communication between the gas source pipe 330 and the primary gas conduit of the individual lateral.

A source pipe connector 342 is positioned along the gas source pipe 330 to allow for connection with a single downpipe which extends from the source of backwash gas. The remaining portions of cutout 303 are filled with a filler material 343, which is provided with a slanted top surface 348. This slanted configuration is designed to allow effluent flow to the distribution holes of the individual adjacent lateral blocks and may also serve to guide backwash gas and liquid up to the filter media above the filler material 343.

FIG. 21 shows a further modification of this embodiment, wherein the air duct block 301 is constructed from an underdrain lateral block located in the middle of the individual lateral. This modification is constructed in the same manner as the air duct block illustrated in FIGS. 19-21 with the addition of a second dividing wall section 315, gas pipe apertures 332, aperture connector 334 and dividing wall opening 340 positioned on the opposite side of the air duct block to cooperate with the portion of the lateral formed on that side. The top surface 348 of filler material 343 is configured to slant toward the closest lateral, resulting in a triangular or "A-frame" shaped top surface.

This embodiment provides for quick retrofitting of existing underdrain lateral systems. It is also envisioned that this embodiment can be used to retrofit underdrain systems having the configuration illustrated in co-pending U.S. application No. 07/649,448. In this situation, the construction of the air duct block is the same as discussed above, except that middle partition 312 need not be attached during retro-fit since a middle partition already exists in these underdrain blocks.

It should be noted that for ease of construction the gas source pipes of the second, third and fourth embodiments may be formed from extruded polyethylene tubing. The air duct blocks of all of these embodiments may be molded, or formed in any conventional manner.

Having described the presently preferred embodiments of the invention, it will be understood that it is not intended to limit the invention except within the scope of the following claims.

I claim:

1. A system for draining and backwashing a filtering media of a type where liquid may be passed down through the media in a filtration mode to an underdrain supporting said media, said underdrain including a plurality of parallel laterals, said system adapted to supply a backwash gas to the underdrain during a backwash mode for cleansing the media, said system comprising:
   a row of interconnected air duct blocks including at least one lower water chamber and at least one upper gas chamber positioned below said filtering media and extending transversely to said laterals;
   means for supplying gas to said air duct blocks;
   each air duct block in communication with at least one adjacent underdrain lateral to supply backwash gas to said lateral;
   wherein said at least one upper gas chamber of each air duct block has means for transverse communication with the upper gas chamber of at least one adjacent air duct block for flow of backwash gas between said air duct blocks.

2. An air duct block for use in draining and backwashing a filtering media of a type where liquid may be passed downward through the media to an underdrain supporting said media, said underdrain including a plurality of parallel laterals, each lateral having an interior wall configuration defining at least one primary conduit and at least two secondary conduits, said air duct block comprising:
   a bottom surface;
   a top surface;
   a pair of sidewalls extending between said bottom surface and said top surface;
   a plurality of interior walls defining at least one lower water chamber, at least one upper gas chamber and at least one upper mixing chamber, said mixing chamber extending directly beneath the top surface;
   a plurality of apertures in said interior walls for providing communication between the water chamber and the mixing chamber and further providing communication between the gas chamber and the mixing chamber; and
   a plurality of dispersion orifices in said top surface providing communication between the mixing chamber and the filter media;
   at least one of said sidewalls having an opening therein providing means for transverse communication between said upper gas chamber and the upper gas chamber of an adjacent air duct block;
   wherein backwash gas is supplied to said gas chamber and backwash liquid is supplied to said water chamber during the backwash mode, said gas chamber and said water chamber being in communication with at least one adjacent underdrain lateral for providing backwash liquid and backwash gas thereto, said backwash gas and said backwash liquid further entering said mixing chamber and proceeding through the dispersion orifices in said top surface to cleanse the filter media directly above said air duct block.

3. The air duct block of claim 2 including a front facade extending between said bottom surface and said top surface, said facade having an outer flange with a plurality of inner partitions, said inner partitions defining at least one primary conduit, said facade adapted to couple said air duct block with an adjacent underdrain lateral, said inner partitions corresponding to the interior wall configuration in said lateral.

4. The air duct block of claim 3 wherein said inner partitions define a lower primary liquid conduit and an upper primary gas conduit.

5. The air duct block of claim 3 wherein said facade includes a pair of end cap walls transversely positioned within said flange on opposed sides of said primary conduit to prevent communication between the upper gas chamber in said air duct block and the secondary conduits in said underdrain lateral.

6. The air duct block of claim 2 including a source connection pipe extending through said top surface in communication with said upper gas chamber for supplying gas thereto.

7. The air duct block of claim 2 including at least one coupling for insertion in said sidewall opening for providing communication between the upper gas chamber and at least one adjacent air duct block.

8. A system for draining and backwashing a filtering media of a type where liquid may be passed downward through the media in a filtration mode to an underdrain supporting said media, said underdrain including a plurality of underdrain filter blocks placed end to end in parallel adjacent rows, each row defining a lateral, said system adapted to supply a backwash gas to the underdrain during a backwash mode for cleansing the media, said system comprising:
   a row of interconnected air duct blocks positioned below said filtering media and extending substantially transversely to said laterals, each air duct block having a bottom surface, a top surface, a pair of sidewalls extending between said top and bottom surfaces and a plurality of interior walls defining at least one lower water chamber, at least one upper gas chamber, and at least one mixing chamber with a middle partition extending between said sidewalls and parallel to said top and bottom surfaces, said interior walls having apertures therein for communication between the lower water chamber and the mixing chamber and further between the upper gas chamber and the mixing chamber;

each air duct block in communication with at least one adjacent underdrain filter block to supply backwash gas to said underdrain filter block during the backwash mode;

each air duct block having a transverse trough defined by an opening in said top surface and a cutaway portion in each sidewall, said trough further defined by a saddle assembly which is integral with said middle partition and with the interior walls which define said upper gas chamber, said saddle assembly having at least one aperture for providing communication between the upper gas chamber and said trough;

an integral tube which is received by the troughs in each of said interconnected air duct blocks and which extends transversely to said laterals, said tube having apertures therein corresponding to the apertures in said saddle assemblies to provide communication between said tube and said upper gas chambers;

a cover having a plurality of dispersion orifices therein extending above the trough in each air duct block and defining a mixing chamber above said tube, said mixing chamber in communication with the mixing chambers in said air duct block;

means for supplying backwash gas to said tube;

wherein backwash gas is supplied to said tube and backwash water is supplied to said lower water chambers during the backwash mode, said backwash gas entering the upper gas chambers in each air duct block through the apertures in said tube thus supplying backwash gas to the underdrain filter blocks of at least one adjacent underdrain lateral, backwash gas and backwash water further entering said mixing chambers through said interior wall apertures and then passing through said dispersion orifices to cleanse media directly above the air duct block.

9. The system of claim 8 wherein each air duct block includes a rear wall extending between said top and bottom surfaces and between said sidewalls.

10. The system of claim 9 wherein each air duct block includes a flume opening in said rear wall providing communication between the lower water chamber and a flume.

11. A system for draining and backwashing a filtering media of a type where liquid may be passed downward through the media in a filtration mode to an underdrain supporting said media, said underdrain including a plurality of underdrain filter blocks placed end to end in parallel adjacent rows, each row defining a lateral, each lateral having at least one primary conduit and at least one secondary conduit, said system adapted to supply a backwash gas to the underdrain during a backwash mode for cleansing the media, said system comprising:

a row of interconnected air duct blocks positioned below said filtering media and extending substantially transversely to said laterals, each air duct block having a bottom surface, a top surface, a pair of sidewalls extending between said top and bottom surfaces, and a middle partition extending between said sidewalls, said middle partition having a first portion parallel to said top and bottom surfaces and cooperating with said bottom surface to define a lower water chamber, with a second portion inclined with respect to said first portion, said middle partition defining a transverse cutout in the air duct block;

a mounting flange extending from said top and bottom surfaces for engaging an adjacent underdrain filter block;

an aperture connector on the second portion of said middle partition;

an integral tube which is received by the cutouts in each of said interconnected air duct blocks and which extends transversely to said laterals, said tube having apertures therein for receiving said aperture connectors and providing communication between said tube and the primary conduit in an adjacent underdrain filter block;

means for supplying backwash gas to said tube;

wherein backwash gas is supplied to said tube and backwash water is supplied to said lower water chambers during the backwash mode, said backwash gas entering the aperture connectors to supply backwash gas to the underdrain filter blocks of at least one adjacent underdrain lateral, with backwash liquid entering said lateral through the lower water chambers.

12. The system of claim 11 wherein each air duct block further comprises a mixing chamber positioned between said top surface and said tube, said mixing chamber in communication with at least one secondary conduit in the adjacent underdrain block, said air duct block further including dispersion orifices in said top surface for communication between the mixing chamber and said filtering media.

13. The system of claim 11 wherein each air duct block includes a rear wall extending between said sidewalls and between the first portion of said middle partition and said bottom surface.

14. The system of claim 13 wherein each air duct block includes a flume opening in said rear wall.

15. The system of claim 11 wherein each air duct block includes a removable orifice positioned in said aperture connector for regulating the velocity of flow between said tube and the primary conduit in said underdrain lateral.

* * * * *